(12) United States Patent  
Sego

(10) Patent No.: US 7,154,434 B1
(45) Date of Patent: Dec. 26, 2006

(54) ANTI-PERSONNEL AIRBORNE RADAR APPLICATION

(75) Inventor: Daniel J. Sego, Seattle, WA (US)

(73) Assignee: The Boeing Company, Chicago, IL (US)

( * ) Notice: Subject to any disclaimer, the term of this patent is extended or adjusted under 35 U.S.C. 154(b) by 12 days.

(21) Appl. No.: 11/162,474

(22) Filed: Sep. 12, 2005

(51) Int. Cl.
*G01S 13/52* (2006.01)
*G01S 13/56* (2006.01)

(52) U.S. Cl. ................ 342/161; 342/27; 342/28; 342/159; 342/160; 342/162; 342/175; 342/195

(58) Field of Classification Search .... 342/25 R–25 F, 342/27, 28, 89, 90, 118, 128–145, 159–164, 342/175, 189–197, 100; 367/87, 93, 94
See application file for complete search history.

(56) References Cited

U.S. PATENT DOCUMENTS

| | | | | |
|---|---|---|---|---|
| 3,603,996 A | * | 9/1971 | Murchison et al. | 342/28 |
| 3,733,603 A | * | 5/1973 | Johnston | 342/192 |
| 3,803,539 A | * | 4/1974 | McMaster | 367/94 |
| 3,882,495 A | * | 5/1975 | Bolger | 342/189 |
| 4,210,912 A | * | 7/1980 | Naidich et al. | 342/160 |
| 4,400,700 A | * | 8/1983 | Rittenbach | 342/100 |
| 5,448,501 A | * | 9/1995 | Hablov et al. | 342/28 |
| 5,530,429 A | * | 6/1996 | Hablov et al. | 342/192 |
| 5,760,687 A | * | 6/1998 | Cousy | 342/27 |
| 5,790,032 A | * | 8/1998 | Schmidt | 342/28 |
| 5,867,257 A | * | 2/1999 | Rice et al. | 342/192 |
| 6,031,482 A | * | 2/2000 | Lemaitre et al. | 342/28 |
| 6,208,286 B1 | * | 3/2001 | Rostislavovich et al. | 342/195 |
| 6,426,718 B1 | | 7/2002 | Ridgway | |
| 6,441,772 B1 | | 8/2002 | Hellsten et al. | |
| 6,518,914 B1 | | 2/2003 | Peterson et al. | |
| 6,603,424 B1 | | 8/2003 | Abatzoglou | |
| 6,650,276 B1 | * | 11/2003 | Lawless | 342/28 |
| 6,691,947 B1 | | 2/2004 | La Fata | |
| 6,697,010 B1 | | 2/2004 | Lam | |
| 6,714,157 B1 | | 3/2004 | Wittenberg | |
| 6,747,593 B1 | | 6/2004 | Jaffer | |
| 6,750,805 B1 | | 6/2004 | Cameron | |
| 6,756,935 B1 | | 6/2004 | Cameron et al. | |
| 6,762,711 B1 | | 7/2004 | Doerfler | |
| 6,765,526 B1 | | 7/2004 | Doerry | |
| 6,784,826 B1 | | 8/2004 | Kane et al. | |
| 6,861,976 B1 | | 3/2005 | Budic | |
| 6,911,933 B1 | | 6/2005 | Mutz et al. | |

OTHER PUBLICATIONS

Raytheon Company, Global Hawk Integrated Sensor Suite and Ground Segment.

* cited by examiner

*Primary Examiner*—Bernarr E. Gregory
(74) *Attorney, Agent, or Firm*—Ostrager Chong Flaherty & Broitman P.C.

(57) ABSTRACT

An anti-personnel airborne radar application for ultra slow target tracking is provided. The anti-personnel airborne radar application includes a rotorcraft and a signal processing system. The signal processing system includes a radar antenna supported by said rotorcraft, a plurality of phase centers, a conditioning circuit for each phase center, an adaptive signal processor, and an ultra slow target indicator. Each phase center is for receiving reflected radar signals received by the radar antenna. The adaptive signal processor processes the received condition signal from each of the phase centers, allowing the ultra slow target indicator to render tracking reports. A method of detecting human motion over a ground swath is also provided.

20 Claims, 3 Drawing Sheets

ANTI-PERSONNEL AIRBORNE RADAR APPLICATION

TECHNICAL FIELD

The present invention relates generally to a radar system, and more particularly, to an anti-personnel airborne radar application for human detection and tracking within a large geographic region.

BACKGROUND DESCRIPTION

There are a subset of the airborne radar systems presently available that are capable of detecting and tracking ground moving vehicles at tactically significant speeds and over a wide geographic region. Depending on the mode of the radar (i.e., synthetic aperture radar imaging—SAR), individual human movement at a point or within a small area of interest can potentially be observed. However, these systems are incapable of tracking ultra slow targets that move within or through a large, rectilinear ground swath: tracking requiring detection at low false alarm rate, with the required level of measurement accuracy and at sufficient update rate to overcome ambiguous report-to-track assignment. The ground swath being significantly larger than a point or area of interest, for example a beam spot projected onto the ground.

There have been many radar systems, both military and commercial, developed and fielded to detect slower targets such as walking or running individuals. However, none have been executed from a moving platform, let alone one that is airborne. All such systems are designed and operate from fixed locations; even if this radar system is vehicle-borne it is still operated when the vehicle becomes motionless, e.g., NIDARS-E developed by Sensor Technologies & Systems, Inc. The radar system are operated from non-moving platforms for any of the following conditions: 1) the Doppler shift imposed on the clutter return due to the motion of the platform can obscure the return from the slowly translating target; 2) the complexity required to compensate for the platform motion raises the radar system costs out of the target marketplace; or 3) the mission application may dictate a fixed-site solution, i.e., perimeter coverage for a forward deployed base or fire base.

The detection of ground moving targets using airborne radar is an evolving research and development area. However, current systems using airborne radar have been focused on wide area search and tracking of slow moving military vehicles. Both mission requirements necessitate radar antenna having long aperture lengths; the first to provide accurate cross range estimates of the target position, and the second to limiting the dominant ground clutter return to the smallest realizable Doppler frequency region. Advanced signal processing algorithms then operate on the Doppler constrained clutter signals to essentially "arrest" the platform motion, thereby permitting detection of endoclutter targets, i.e., those with velocity components in the direction of the radar, along the radar line-of-sight, that lie within the mainbeam clutter Doppler return while presuming sufficiently low sidelobe levels. The resulting antenna sizes in order to detect, and accurately geolocate from standoff distances, the ground moving military vehicles can be up to on the order of 20 to 24 feet which, in turn, requires even larger transport class of aircraft to support the airborne antenna, resulting in travel at even higher ground speeds. The increased ground speed, though offset by the antenna size, can result in a degraded minimum detectable velocity unless design, fabrication and signal processing measures are taken. However, such airborne radar system would require an antenna that becomes too large to transport (depending on the air vehicle), is prohibitively expensive (when gauged against the anti-personnel mission), or is unable to detect slow moving targets including ultra slow moving targets such as an individual walking.

More recently, smaller apertures have been employed on unmanned air vehicles (UAV). The high altitude UAV is slightly slower platform, than the transport class aircraft required to carry the very long aperture, and the antenna length can be relaxed somewhat to meet minimum detectable velocity (MDV) requirements, though at the expense of position estimation accuracy and tracking performance. One such high altitude UAV is the RH-4A Global Hawk. However, these high altitude UAV's are unable to meet the MDV requirement for detecting ultra slow targets. Synthetic aperture radar may provide a system for detecting ultra slow targets.

Synthetic aperture radar (SAR) techniques have been developed that support detection of ground moving targets, including those with slower target speeds. For instance, single aperture imagery is used to detect the blurring of the larger ground vehicle, provided that the target is sufficiently strong radar cross section (RCS), as it migrates through the image pixels during the image formation time, such as a streak in the image, while ignoring the cross range displacement of the target due to Doppler effects. There are various signal processing variants on the SAR technique known to one skilled in the art. Another technique for the detection of ground moving targets is known as along track interferometry (ATI) and uses two antennas that produce two SAR images. The ATI antennas are on a single platform and are separated by a fairly large distance in the along-velocity direction. The images are differenced and focused, thereby being capable of providing a velocity map of the scene. As with SAR, the ATI detection requires that the target must be sufficiently bright against the focused clutter returns in order to detect the ground moving targets. A third technique, known as Arrested SAR, employs a variant of space-time adaptive processing (STAP) and at least two antennas separated in the along-velocity direction of the moving platform, but having a much shorter baseline than ATI system. Arrested SAR, in which is essentially an imaging mode, requires that the beam remains ground registered for the same dwell, as would be required for a SAR image system. The processor for these SAR types of systems then cancels the clutter return and produces an image of all non-stationary objects. The SAR approach evidences all the effects of moving targets translating through the imaged scene, including blurring and azimuth displacement, but will enhance the target to interference ratio as the unmoving clutter is cancelled down to some residue level (a function of the radar system and platform errors).

However, these SAR-based approaches are very inefficient for a wide area search over a ground swath, because of the amount of time the beam must dwell on a single ground position. Resultantly, SAR-based approaches are ill-suited for ground swath coverage applications. For example, when a SAR-based system is in the stripmap mode, i.e., the antenna beam is steered to 90 degrees to the velocity vector of the airborne platform. The processor produces imagery at the rate of platform translation, thereby providing "push broom" coverage over the scan area. Image resolution is derived from the antenna size in this "strip map" mode of operation. If detection occurs, the radar system may scan a radar beam backwards to confirm the detection, i.e., a squinted beam collection. However, while the radar is backwards scanning, the system necessarily must sacrifice coverage over some other region because the radar has then fallen behind the aircraft motion and cannot catch up. The SAR-based approach prohibits target tracking while maintaining coverage as the aircraft flies along.

Another difficulty with the above mentioned approach is the image resolution required for reliable detection. Typically, on the order of 5–10 pixels per characteristic target dimension are necessary to reliably detect in an image, with low false alarm rate. Point scatterers, by definition, detect only in a single pixel. Fence posts, lamp posts, street sign posts, etc. are all strong targets that are very small spatially. To meet the detectability resolution constraint, and be distinguishable from clutter discretes, the image resolution must be significantly expanded. The radar cross section, of clutter and targets, decreases as the resolution of the radar decreases. Significantly, as the RCS of a target object become sufficiently small when over-resolved, e.g., an adult human form having nominally 1 $m^2$ under-resolved RCS, the signal to noise ratio (SINR), or signal to noise ratio (SNR) decreases. Additionally, the even longer aperture time ensure that there will be target blurring as the ultra-slow target migrates through range and azimuth cells during the aperture time associated with the higher image resolution.

Accordingly, it would be desirable to provide a system capable of detecting moving individuals moving within a geometric area, such as a rectilinear ground swath. It would also be of benefit to provide a system capable detecting ultra slow targets moving within the ground swath. Of further benefit would be a system that is capable of providing periodic surveillance to detect and track ultra slow targets, such as individuals, that were entering and crossing the ground swath. Moreover, it would be advantageous to provide a system capable of detecting the ultra slow targets moving within a ground swath during all weather, day and night operations. Further, it would be of benefit to provide such a system capable of covering very large areas, typically many times larger than optical systems, with short revisit times and higher repetitive surveillance rates consistent with developing a smoothed track estimate, thereby boosting the amount of information available on the target. This information includes higher order modulations induced from the relative movement of the parts of the body to permit discrimination of an individual from nuisance targets, such as animals. Another desired attribute would be to provide a system capable of surveillance from afar, thereby providing advantageously anti-tip-off coverage over a coverage area, and yielding the rapid response, flexible employment and access permitted by the airborne platform.

SUMMARY OF THE INVENTION

An anti-personnel airborne radar application is provided. The anti-personnel airborne radar application provides for detecting moving individuals moving within a geometric area, such as a ground swath. Also, the anti-personnel airborne radar application provides detection capabilities for ultra slow targets moving within a ground swath. Further, a radar system for periodic surveillance to detect and track ultra slow targets, such as individuals, that were entering and crossing the ground swath. Moreover, advantageous the system is capable of detecting the ultra slow targets moving within a ground swath during all weather, day and night operations. Furthermore, a system may is provided capable of covering very large areas, typically many times larger than optical systems, with short revisit times and higher repetitive surveillance rates. The system will perform these functions at greatly reduced expense than that afforded by very large apertures on transport-class platforms. Finally, the system provides the capability for surveillance from afar, thereby advantageously providing anti-tip-off coverage over a coverage area and yielding the rapid response, flexible employment and access permitted by the airborne platform.

In accordance with the present invention, the anti-personnel airborne radar application includes a rotorcraft and a signal processing system. The signal processing system includes a radar antenna supported by said rotorcraft, a plurality of phase centers, a conditioning circuit for each phase center, an adaptive signal processor, and an ultra slow target indicator. Each phase center is for receiving reflected radar signals impinging on the radar antenna. The adaptive signal processor processes the received condition signal from each of the phase centers, allowing the ultra slow target indicator to render detection reports that are, in turn, smoothed by an appropriate tracking filter.

A method of detecting human motion over a ground swath is also provided.

Other aspects and advantages of the present invention will become apparent upon the following detailed description and appended claims, and upon reference to the accompanying drawings.

DETAILED DESCRIPTION OF THE INVENTION

Figure 1:
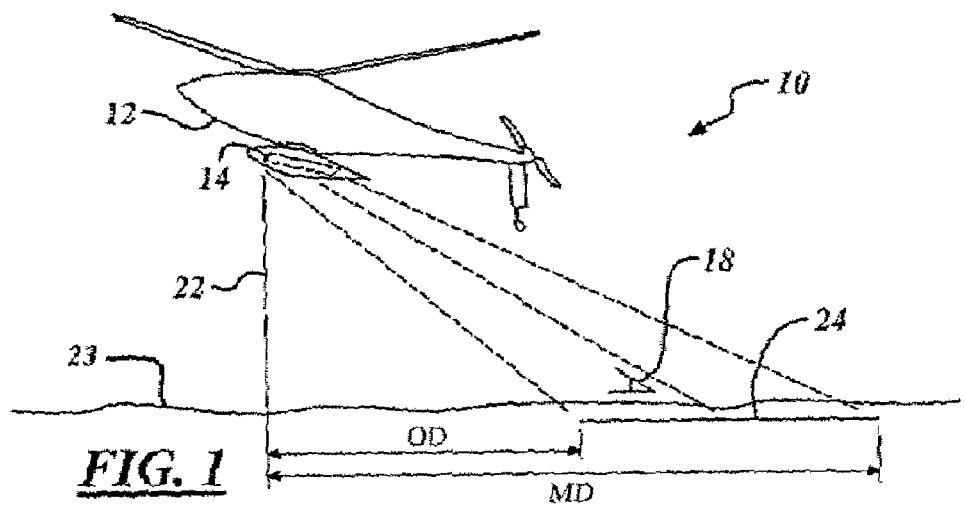
FIG. 1 shows an illustrative view of a rotorcraft having an antenna for an anti-personnel airborne radar application being used to advantage in accordance with the present invention.

In the following figures the same reference numerals will be used to identify the same components of a given embodiment.

The anti-personnel airborne radar application (AARA) for human tracking provides an airborne radar system for wide area search and tracking of an individual, individuals or groups of individuals that are walking over the ground. The invention employs a radar system with an operating frequency directed primarily for minimal-to-no foliage cover terrains. However, while arboreal coverage is appropriate where the individual is not masked by the foliage, the invention is not necessarily directed toward applications requiring penetration of denser arboreal or multi-layer canopies. Because the operating frequency of a radar system is well understood by person of skill in the art, discussion is not necessary for a proper understanding of the invention here presented.

The AARA is the result of the combination of a radar system originally designed for ground moving target indication (GMTI) operation at higher airborne platform speeds and adapting the GMTI to a more slowly translating vehicle. This includes optimizing the waveform against the ultraslow target speeds. GMTI is distinguished from SAR in that it requires a lesser dwell to perform the clutter rejection and target detection function and by the radar product. GMTI produces indications of motion, SAR a microwave picture of motionless objects and scenes. The dwell is the amount of time required to be focused on a particular ground patch. In this manner, the GMTI system can scan large areas repeatedly in a short time interval, producing a sequence of detections that support tracking, thereby developing and smoothing (average for the purpose of improving) estimates of position, heading and true ground speed for each of the targets detected. While the GMTI mode does not adequately provide for a two dimensional spatial resolution as given by SAR, GMTI does provide one dimension of higher resolution, i.e. the range dimension and must estimate the target position within the mainbeam using other means. GMTI is also capable of extracting higher order modulations that are related to the periodic motions of the arms and legs while walking. Normally a two-sided spectrum around the Doppler shift from the linear translation is produced. This two sided spectrum is also know as the "skin return", so named due to the reflection off the skin of the target vehicle. The shape of spectrum and temporal behavior can support discrimination of individuals from nuisance targets, such as animals.

The present invention is further enhanced by the slower translation speed of the moving platform. Specifically, the RCS of an average sized person in motion provides radar reflection detectable by the slower moving platform. The platform's speed is slow enough to allow the system to complete the requisite number of scans and sequences required for signal-to-interference-plus-noise strength enhancement required for detection of slow and ultra slow moving targets (USMT).

FIG. 1 shows an illustrative view of a rotorcraft 12 having an antenna 14 for an anti-personnel airborne radar application, or AARA 10 being used to advantage in accordance with the present invention. The AARA 10 utilizes a rotorcraft 12 as the platform for supporting the antenna 14 and requires sustained flight capability. The rotorcraft 12 has sustainable altitude capabilities ranging above 10,000 feet. The altitude of the rotorcraft 12 is represented by the ground height 22 from the ground 23. The rotorcraft 12 may have higher sustainable altitude capabilities ranging up to 16,000 ft and even as high as 22,000 feet. Another requirement of the rotorcraft 12, is that it be capable of forward velocity V (shown in FIG. 5) while supporting the AARA. The rotorcraft 12 may be any rotorcraft capable of meeting the requirements for the AARA. One rotorcraft could be the Boeing A-160, not yet in production. However, it is recognized that other rotorcraft such as the UH-1 or the UH-60, including any other similar classes of helicopters may also be used to advantage. While a rotorcraft has been selected as the platform for supporting the AARA, other suitable platforms may be utilized. However, it is recognized that ground-moving platforms are not appropriate for the present application, and high altitude UAV aircraft fly at speeds above threshold detection capabilities given the potential antenna instantiation.

Figure 5:
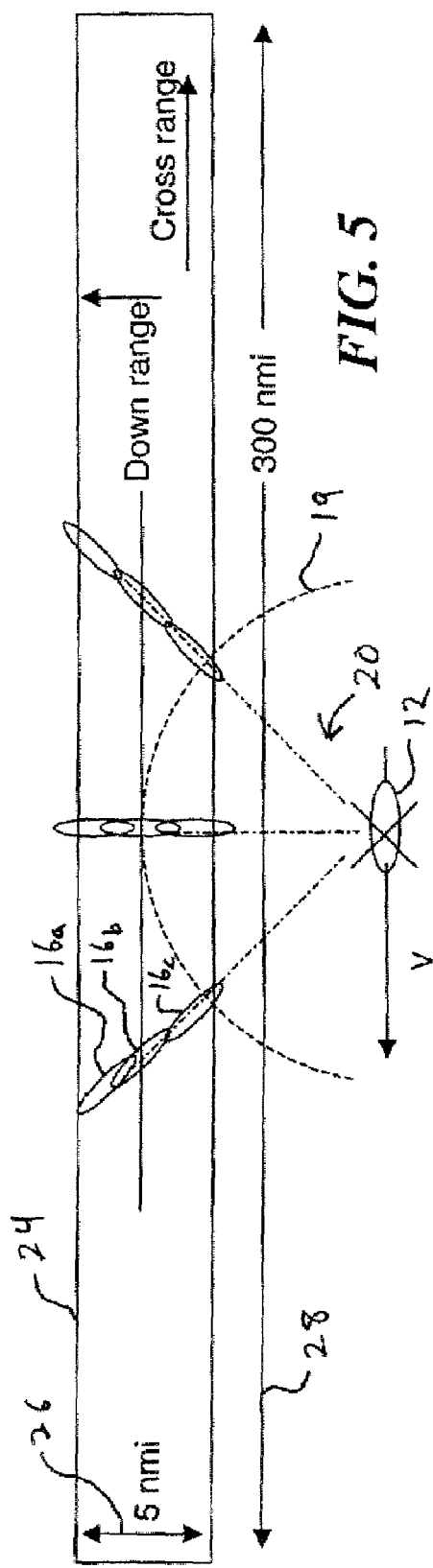
FIG. 5 shows a candidate field of regard in accordance with the present invention.

FIG. 5 shows a candidate field of regard (FOR) or ground swath 24 in accordance with the present invention. The ground swath is the area of interest on the ground in which it is desirable to provide periodic monitoring and detection surveillance of ultra slow moving targets. A down range dimension 26 and a cross range dimension 28 represent the area of the ground swath 24. In this embodiment the down range dimension is 5 nmi and the cross range dimension is 300 nmi. However, it is recognized that that the dimension of the ground swath may vary in size and in shape.

The antenna has a grazing contour 19, which reflects a grazing angle 18 when scanned through a scan angle 20. In order to get complete coverage of a field of view 16 for a rotorcraft 12 having a grazing angle of 35 degrees, an offset distance of 2.2 nmi, a down range distance of 5 nmi, and a scan angle of +/−45 degrees, it requires an antenna 14 having at least a 3 bar search raster (a function of the cross range dimension and the height of the antenna vertical aperture). The field of view for the 3 bar search raster is represented by field of views 16a, 16b, and 16c. Because of the specific geometry requirements of the present invention, it is recognized that the antenna 14 may have multiple number of bars on the search raster in order to fully complement the requirements of present invention in providing complete detection coverage through the down range dimension 26 and the scan angle 20.

It should be noted that other field of regards are available to match the surveillance mission or may be based on the beam scanning capabilities of the antenna.

Figure 6:
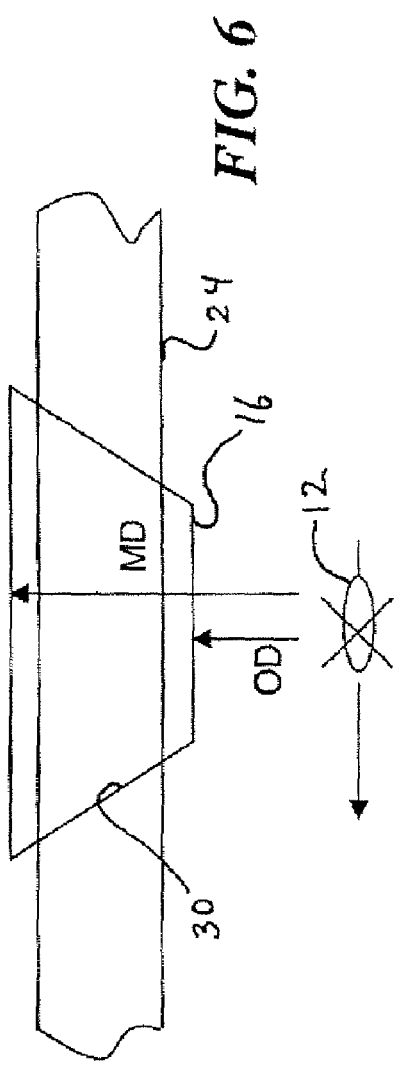
FIG. 6 shows a radar field of view in accordance with the present invention for a large, rectilinear ground swath as in FIG. 5.

FIG. 6 shows a field of view 16 of the radar in accordance with the present invention for a large, rectilinear ground swath as in FIG. 5. The antenna 14 of the rotorcraft 12 repetitively scans the ground swath 24 at the grazing angle 18 through the scan angle 20. Mapping one scan of the antenna onto the ground swath 24 creates a trapezoidal coverage area over the ground swath 24. This area is defined by the scan limits of the antenna realized and by the tolerable degree of Doppler dilution of the ground speed of the moving individual projected onto the line-of-sight to the radar. This trapezoidal area represents the detection area in which each sequence of detection may occur. The trapezoidal area may overlap the field of regard as is shown or may coincide with a particular area of interest within the field of regard. Also, it is recognized that this representative area, i.e. the trapezoid, moves perpendicular to and with the rotorcraft 12 at the same velocity as the rotorcraft.

Figure 2:
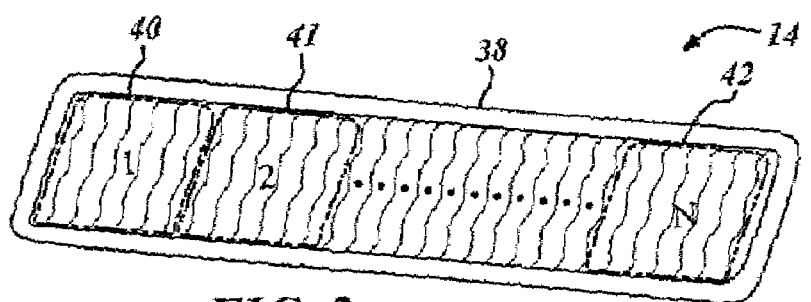
FIG. 2 shows an illustrative view of the antenna in accordance with the present invention.

FIG. 2 shows an illustrative view of the antenna 14 in accordance with the present invention. The antenna 14 of the AARA 10 employs multiple digital phase centers 40, 41, 42 in proper physical relationship wherein deterministic or adaptive algorithms may narrow the system response to mainbeam clutter. One system for clutter rejection is provided by U.S. Pat. No. 6,756,935 entitled "Full Polarization Ground Moving Target Indicator Radar Automatic Target Detection Algorithm", issued to the same assignee as in the present invention, incorporated by reference herein. Other algorithms known to persons of skill in the art may also be used.

The AARA 10 radiates a coherent pulse train waveform from the full aperture 38 and receives the reflected ground and target returns on individual physical subapertures or phase centers 40, 41, 42. The present invention anticipates the utilization of at least three phase centers to achieve the smallest minimum detectable velocity (MDV) for a particular AARA implementation, though like performance may be possible with only two. While the phase centers are arranged, as shown with the full aperture, it is recognized that the antenna design must be such that the channels are well matched for amplitude and phase and the spacing of the phase centers and the overall antenna illumination prevents the formation of parasitic grating lobes throughout the electronic scan volume to the greatest degree possible.

Figure 3:
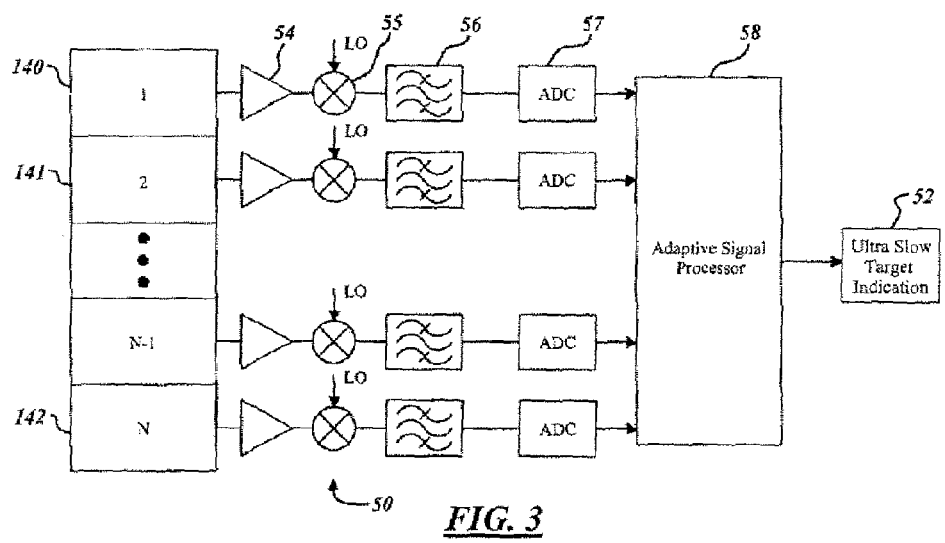
FIG. 3 shows the anti-personnel airborne radar application top-level system block diagram for adapted ground moving target indication in accordance with the present invention.

FIG. 3 shows the anti-personnel airborne radar application top-level system block diagram 50 for adapted ground moving target indication, or ultra slow target indication 52 in accordance with the present invention. Each of the phase centers are shown in blocks 140, 141, 142 for a system having only 3 physical subapertures 40, 41, 42. The reflected signal received in phase center 141, for instance, is conditioned in conditioning blocks 54, 55, 56, 57. Block 54 is an amplification block. Block 55 is a summation and comparison block. Block 56 is a signal-conditioning block. Block 57 is an analog to digital converter block. After conversion to digital form, the signal is then passed to an adaptive signal processor 58. After deterministic or adaptive clutter rejection in the signal conditioning blocks, the signal is tested against a threshold, the magnitude of which is estimated from the residual clutter and noise from the vicinity of the cell under test allowing a detection decision to issue. After the detection decision issues for a signal, the threshold may be updated to await a new signal for improved processing by further reducing the error covariance of a detection decision. The detection decision issue may then pass to the ultra slow target indication block 52 for producing the ground movement radar report. The target indication block may provide position estimation in range, azimuth, and Doppler, however the system is preferentially directed toward providing estimation of ultra slow target indication of position, true ground speed and direction of travel. It is recognized that various other signal processing algorithms for detection and estimation may be used in block 58, such as space-time adaptive processing.

It should be noted that the minimum detectable velocity MDV is dependent on the actual implementation of AARA. In this regard the ground velocity of the rotorcraft, the implemented altitude of the rotorcraft, the antenna construct, the noise in the system (including rotorcraft-induced modulations), the FOV from the antenna, the FOR for the particular application, and the sequence of detections capability for a particular dwell all factor into the MDV.

Figure 4:
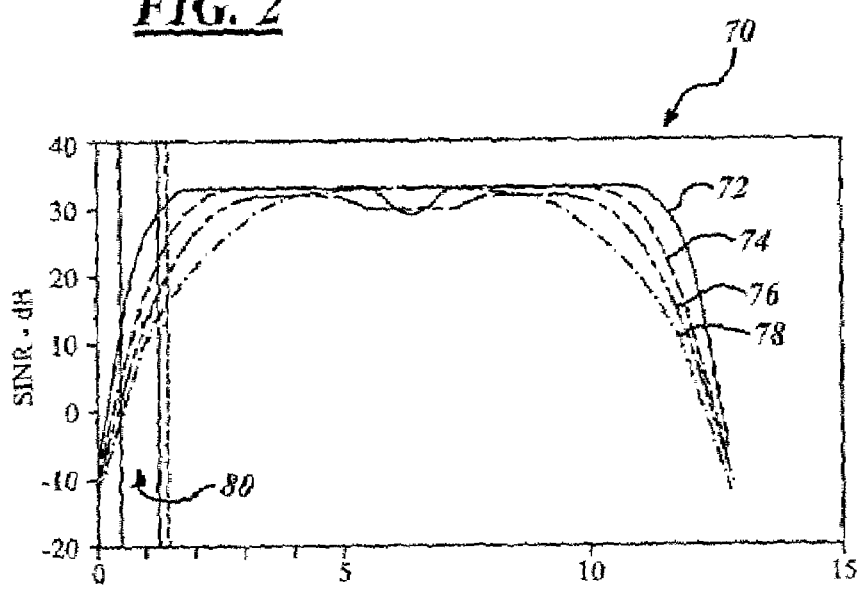
FIG. 4 shows a graph of the detection gain versus target velocity for various platform ground speed.

A measure of the performance of the present invention is shown in FIG. 4. FIG. 4 shows a graph 70 of the detection gain versus target velocity for various platform ground speeds 72, 74, 76, 78 with the antenna size held constant. Walking speed on unimproved surface for a typical target of interest in indicated by the movement band 80. The typical movement speed of a target of interest is likely to range between 0.5–1.2 meters per second. Moreover, the average walking speed for the many of the targets of interest will likely range between 0.6–0.9 meters per second when traveling over a down range distance such as 5 miles. The MDV is too high for ultra slow target detection for indicated platform ground speeds 74, 76, 78 having speeds of 150, 225, and 300 knots, respectively. These high ground speeds are likely encountered with a Global Hawk class of aircraft. At best, platform ground speed 74 may produce a host of false indication when a target object is moving at 1.2 meters per second and the SINR is nearly 20 db. For indicated platform ground speed 72 having a speed of 75 knots, such as the rotorcraft 12 of the present invention, the MDV ranges near a threshold of detecting a target object moving at 0.5 meters per second or faster.

The AARA may have a MDV for detecting ultra slow target moving at 1.5 meter per second across the ground swath. Also, the AARA may have a MDV for detecting ultra slow target moving at 1.2 meter per second across the ground swath. Further, the AARA may have a MDV for detecting ultra slow target moving at 0.9 meter per second across the ground swath. Moreover, the AARA may have a MDV for detecting ultra slow target moving at 0.5 meter per second across the ground swath.

Improved MDV may be obtained by decreasing the rotorcraft velocity below 50 knots. Additional improvement of MDV may be obtained by decreasing the rotorcraft velocity below 25 knots or by bring the rotorcraft to a standstill while supporting the AARA. However, as the rotorcraft's speed decreases, so must the cross range dimension of the ground swath in order to maintain continuous surveillance of an area without suffering loss of MDV.

The MDV is set by the forward velocity of the rotorcraft as it transverses the ground swath. This limitation invokes the relationship that the maximum velocity of a moving target limits the cross range dimension of the ground swath if continuous coverage of the ground swath is desired to detect target. However, partial or periodic coverage of the ground swath may occur as is desirable.

It should be recognized that the rotorcraft 12 might move slower or faster depending upon the MDV requirements in order to produce the ultra slow target indication. It is also recognized that the antenna size, form factor, surveillance geometry and platform speed and surface clutter effects all combine to produce a spectrum of the signal-to-interference-plus-noise or SINR. The SINR translates into probability of detection. A low SINR corresponds to low probability of detection. Also, the AARA lends itself to single coherent processing interval CPI waveforms and processing, because the geometry and target attributes do not require ambiguity resolution as is known by a person of skill in the art. Further, due to uncertainties of the statistical properties of the scattered RF radiation from the human form, a Swerling I behavior is assumed and factored into the signal processing as is well understood to a person of skill in the art.

Returning to FIG. 6, the radar field of view 30 is represented by the inner most trapezoid corresponding with the ground swath 24. It is noted that the target dwell and viewing opportunities are a factor of the target speed, the rotorcraft velocity, and the repetition rate for each scan across the radar field of view. For example, a target having a speed of 2–3 mph, averaged over a 5 nmi wide swath will result in a crossing time between approximately 1.5 to 2.5 hours. With the ground swath length being 300 miles and the rotorcraft traveling at 75 knots, the target dwell in the radar field of view 30 is approximately 0.2 hours. Resultantly, for the present invention under the example conditions, the radar antenna 14 will have approximately 30 detection opportunities while the target is crossing the ground swath. Each detection opportunities provides further processing refinement facilitating error reduction and decreasing false alarms rates, while increasing the capability of detecting ultra slow moving targets.

The grazing angle 18 may have minimum and maximum grazing angles. It is contemplated that the minimum and maximum grazing angles may range between 12 degrees and 65 degrees, thereby corresponding to minimum and maximum ranges of 1.55 nmi for the offset distance OD and a 15.34 nmi for the maximum distance MD for a rotorcraft traveling at 20,000 feet to cover a ground swath 24 having a down range dimension of 5 nmi so choosing the grazing angles of operation to prevent undesirable blockage of targets from the radar by terrain and to minimize foliage, if present because this approach is less than optimum for a 3 bar search raster antenna for providing coverage over a down range dimension of 5 nmi, a rotor craft placed at the point of closest approach having minimum and maximum ranges of 2.2 nmi for the offset distance OD and a 7.2 nmi for the maximum distance MD for a rotorcraft, will provide improved coverage over the area of primary interest. It is understood that the grazing angle 18 may be selected for the particular application. Also, the scan angle 20 may be selected to optimize the radar dwell time and number of potential detection for a particular target dwell time.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. An anti-personnel airborne radar application for target tracking comprising:
   a rotorcraft; and
   a signal processing system, wherein said signal processing system comprises:
   a radar antenna supported by said rotorcraft, said radar antenna comprising a plurality of subapertures during reception of reflected radar signals, each of said subapertures receiving respective reflected radar signals impinging thereon;
   a plurality of conditioning circuits, each of said conditioning circuits receiving signals from a respective one of said subapertures, said signals to be conditioned being a function of at least the reflected radar signals impinging on the respective subaperture;
   an adaptive signal processor that processes conditioned signals received from said plurality of conditioning circuits and outputs a signal representing detection of an ultra slow moving target; and
   an ultra slow moving target indicator for indicating detection of an ultra slow moving target in response to receipt from said adaptive signal processor of said signal representing said decision.

2. The anti-personnel airborne radar application according to claim 1, wherein said ultra slow moving target indicator indicates the estimated position and direction of travel of said detected ultra slow moving target.

3. The anti-personnel airborne radar application according to claim 1, wherein said signal processing system is capable of detecting a target moving at a velocity of 1.5 meters per second.

4. The anti-personnel airborne radar application according to claim 1, wherein said signal processing system is capable of detecting a target moving at a velocity of 1.2 meters per second.

5. The anti-personnel airborne radar application according to claim 1, wherein said signal processing system is capable of detecting a target moving at a velocity of 0.9 meter per second.

6. The anti-personnel airborne radar application according to claim 1, wherein said signal processing system is capable of detecting a target moving at a velocity of 0.5 meter per second.

7. The anti-personnel airborne radar application according to claim 1, wherein said rotorcraft has sustainable altitude capabilities above 10,000 feet.

8. The anti-personnel airborne radar application according to claim 1, wherein said rotorcraft has sustainable altitude capabilities above 16,000 feet.

9. The anti-personnel airborne radar application according to claim 1, wherein said rotorcraft has sustainable altitude capabilities above 22,000 feet.

10. The anti-personnel airborne radar application according to claim 1, wherein said rotorcraft has sustainable forward velocity not exceeding 100 knots.

11. The anti-personnel airborne radar application according to claim 1, wherein said rotorcraft has sustainable forward velocity not exceeding 75 knots.

12. The anti-personnel airborne radar application according to claim 1, wherein said rotorcraft has sustainable forward velocity not exceeding 50 knots.

13. The anti-personnel airborne radar application according to claim 1, wherein said rotorcraft has sustainable stationary motion at an altitude up to 22,000 feet.

14. The anti-personnel airborne radar application according to claim 1, wherein said signal processing system has a signal-to-interference-plus-noise ratio of 10 dB for a target having a velocity of 0.5 meter per second while said rotorcraft is traveling at 75 knots.

15. The anti-personnel airborne radar application according to claim 1, wherein said radar antenna has at least a three-bar raster.

16. The anti-personnel airborne radar application according to claim 1, wherein said radar antenna has a full aperture during transmission and at least three subapertures during reception.

17. The anti-personnel airborne radar application according to claim 1, wherein said signal processing system is capable of monitoring a rectilinear ground swath during forward movement of said rotorcraft.

18. A method of detecting motion of one or more targets over a ground swath comprising the following steps:
   providing an anti-personnel airborne radar application that is capable of detecting a target moving at a velocity less than 3 meters per second;
   determining a ground swath for surveillance, the ground swath having a cross range dimension and a down range dimension;
   traversing the cross range dimension of the ground swath; and
   scanning across the down range dimension while traversing the ground swath in the cross range dimension,
   wherein the anti-personnel airborne radar application produces a report in response to detection of a target moving at a velocity less than 3 meters per second.

19. The method according to claim 18, further comprising the step of determining a maximum forward velocity of the anti-personnel airborne radar application that enables continuous coverage of the ground swath for an ultra slow moving target.

20. An anti-personnel airborne radar application for target tracking comprising:
   a rotorcraft having sustainable altitude capabilities at 22,000 feet and a forward velocity not exceeding 100 knots; and
   a signal processing system, wherein said signal processing system comprises:
   a radar antenna supported by said rotorcraft, said radar antenna comprising a plurality of subapertures during reception of reflected radar signals, each of said subapertures receiving respective reflected radar signals impinging thereon;
   a plurality of conditioning circuits, each of said conditioning circuits receiving signals from a respective one of said subapertures, said signals to be conditioned being a function of at least the reflected radar signals impinging on the respective subaperture;
   an adaptive signal processor that processes conditioned signals received from said plurality of conditioning circuits and outputs a signal representing detection of an ultra slow moving target; and
   an ultra slow moving target indicator for indicating detection of an ultra slow moving target in response to receipt from said adaptive signal processor of said signal representing said decision, wherein said signal processing system has a minimum detectable velocity of 0.5 meter per second.

* * * * *